Patented June 12, 1928.

1,673,274

UNITED STATES PATENT OFFICE.

LEO WALLERSTEIN, OF NEW YORK, N. Y., ASSIGNOR TO WALLERSTEIN COMPANY, INC., OF NEW YORK, N. Y., A CORPORATION OF NEW YORK.

PROCESS OF MAKING BEVERAGES.

No Drawing.   Application filed August 13, 1920.   Serial No. 403,212.

This invention relates to an improved process of making cereal beverages having a malt and hop flavor and a low alcohol content, and to an improved beverage of this character.

In making cereal beverages, malt is usually principally used, grains, such as wheat, rice and barley, corn and oats being sometimes used as adjuncts. In the ordinary process of manufacture, ground malt is mixed with water to make a mash which is then brought to a proper temperature for conversion, and conversion proceeds until the diastase of the malt has changed the starches into dextrines and fermentable sugars. If other grains are used, they are usually separately cooked, a little malt having been previously added for the purpose of liquefying the starch.

After conversion, the grains and dregs containing the insoluble proteins and other waste substances are separated from the wort, and the filtered liquor is boiled with hops. After this boiling and the subsequent cooling, yeast may be added, fermentation allowed to go on, and the resulting liquor dealcoholized, or the fermentation may be arrested when the desired low percentage of alcohol is developed. In either case, the beverage is usually finally finished by the usual process of carbonization.

Variations of the processes referred to are employed, but in the main, the usual processes of making cereal beverages having a malt and hop flavor is as above described.

Beverages made in the manner above described obviously contain only such protein substances as are soluble in the water used and even some of these soluble proteins are coagulated during boiling with hops, and are subsequently precipitated out. There is, therefore, necessarily a considerable loss of proteins in the process of manufacture above referred to. It is, of course, well known that somewhat higher percentages of proteins may be obtained in the beverage by careful mashing at low temperatures, say, about 50° C., but this practice results in the production of a wort which has a low percentage of dextrines and a high precentage of maltose. Such a wort is not desirable for the production of beverages of the character described having a low alcoholic content, because the maltose is, comparatively speaking, highly fermentable and the high percentage of fermentable substances, particularly where a considerable quantity of malt is used, tends to increase the alcoholic content of the beverage. Unless the beverage is dealcoholized during the process of manufacture, the practice is usually followed of considerably reducing the percentage of malt in the mash and correspondingly increasing the percentage of starchy grains. The method of procedure is, however, substantially that above described, except that higher conversion temperatures are used. The resulting extract has a low percentage of fermentable substances, but is also very low in proteins. Beverages made in this way sometimes exhibit a protein content as low as 0.1 of one per cent. This low percentage of proteins is due not only to the method of procedure above described, but also because the original gravity of the wort made from these high dextrinous extracts, is usually kept low, say, from 5° to 7° Balling. This is done because it is desired not only to avoid the formation of a high percentage of alcohol but also to avoid the production of beverages too high in extractive matter, such as carbohydrates. A beverage which contains too high a percentage of carbohydrates is not palatable and is regarded as difficult of digestion. This dilution of the wort, while it reduces the carbohydrates, also, of course, reduces the proteins. The proteins, however, are largely responsible for the palatability, the foam producing and foam keeping qualities, the nutritive quality, and the stimulating effect of the beverage.

In accordance with the novel process which forms the subject of this invention, a wort is produced which is characterized by a comparatively low percentage of fermentable sugars, and a high percentage of proteins, the proteins being so treated during manufacture that a high percentage of them is retained in the wort in soluble form. Beverages so made will, therefore, have an increased protein content with the result that the palatability, the foam producing and foam keeping qualities, the nutritive quality, and the stimulating effect of the beverage will be increased. The proteins have, as is well known, a stimulating effect, and the increase in the proteins replaces to a certain extent the loss in stimulating effect due to the reduction of the alcohol.

In making a beverage in accordance with the invention, a cereal mash is made and during further procedure, diastatic conversion is allowed to take place. The mash may consist of malt alone or it may consist of a mixture of malt and unmalted cereals, but when such mixture is used the percentage of malt is preferably high. Where unmalted cereals are used, they should usually be boiled prior to conversion to gelatinize the starch. Before, during or after conversion, a proteolyzing agent, such as a proteolytic enzym, is added to the mash to effect the substantial proteolysis of the proteins contained in the mash.

Enzyms which have been found satisfactory for the proteolysis referred to are papain and pepsin. The proportion in which the enzyms are added is of considerable importance. Satisfactory results have been obtained by the use of one pound U. S. P. pepsin 1:3000, or one pound of ordinary commercial papain for each one hundred pounds of protein contained in the mash. Under ordinary conditions, however, papain gives better results than pepsin.

If the conversion of the starches into soluble carbohydrates be allowed to go on at a temperature of about 75° C. the percentage of dextrines will be relatively high, and the percentage of fermentable sugars or maltose relatively low. As this temperature may be higher than that which is favorable to proteolysis, it may be desirable to allow the conversion to precede proteolysis, the temperature of the mash being lowered after conversion to around 60° to 65° C. Further, by properly controlling the temperature of the mash during proteolysis, a desired lactic acid acidity can be obtained and at the same time the maltose content can be lowered, as the formation of lactic acid reduces the maltose. A favorable temperature for the development of lactic acid in the mesh is around 50° C. If the temperature of the mash be lowered to 50° C. and the mash be allowed to stand for a time at this temperature, lactic acid will develop, pure culture of lactic acid bacteria being added, if desirable. After the desired acidity has been obtained, the temperature can be raised to stop further acidification. After the development of the lactic acid, it may be neutralized, in whole or in part, by the addition of hydroxide of calcium or calcium carbonate. Where this practice is followed, calcium lactate will be found in the finished product. If it is desired to further lower the maltose content, after neutralization the lactic acid development may again be proceeded with, which will change over more maltose, the excess of lactic acid being again neutralized.

After conversion, proteolysis and adjustment of acidity, if desired, the mash is filtered and the filtrate, with or without the addition of water, boiled with hops. As a general rule, the density of the wort thus boiled with hops may be from 5° to 7° Balling. The liquor after boiling with hops can be stored, filtered and finished by carbonating. Preferably, however, after cooling, small quantities of yeast are added, say from one-quarter to one pound per barrel of thirty-one gallons of the finished beverage, and fermentation is allowed to proceed until the desired amount of alcohol is produced. The beverage is then finished in the usual manner by filtering, storing and carbonating, or by such selection of these steps as may seem desirable.

If desirable, all or part of the liquor above described may, after fermentation, be dealcoholized.

A beverage made in the manner above described will contain a high percentage of soluble non-coagulable proteins, this percentage depending, of course, on the cereals used and the thoroughness with which the proteolysis is carried on. Where malt alone is used and a sufficient proteolysis is had, the beverage made as above described may contain from 0.7 to 1.0 percent of protein. Further, by the addition to the mash of carefully selected unmalted cereals, excellent results can be obtained and the percentage of malt reduced.

What is claimed is:

1. The process of making an alcohol reduced cereal beverage which consists in making a mash of a material containing malt, allowing conversion to go on at temperatures which will produce a high percentage of dextrines and a low percentage of fermentable sugars, proteolyzing by adding a proteolytic enzym to the mash, filtering, boiling with hops, and finishing into a beverage.

2. The process of making an alcohol reduced cereal beverage which consists in making a mash of a material containing malt, allowing conversion to go on at temperatures which will produce a high percentage of dextrines and a low percentage of fermentable sugars, proteolyzing by adding a proteolytic enzym to the mash inoculating the mash with lactic acid bacteria, keeping the temperature of the mash at approximately 50° C. during proteolysis, filtering, boiling with hops, and finishing into a beverage.

In testimony whereof, I have hereunto set my hand.

LEO WALLERSTEIN.